United States Patent [19]

Jantzen

[11] Patent Number: 5,628,808
[45] Date of Patent: May 13, 1997

[54] GLASS MELTER OFF-GAS SYSTEM

[75] Inventor: Carol M. Jantzen, Aiken, S.C.

[73] Assignee: The United States of America as represented by the United States Department of Energy, Washington, D.C.

[21] Appl. No.: 524,890

[22] Filed: Sep. 7, 1995

Related U.S. Application Data

[60] Continuation of Ser. No. 264,277, Jun. 23, 1994, abandoned, which is a division of Ser. No. 841,170, Feb. 25, 1992, abandoned.

[51] Int. Cl.$^6$ ................................................. C03B 5/167
[52] U.S. Cl. .................. 65/27; 65/134.6; 65/168; 373/27; 373/33
[58] Field of Search .................. 373/27, 33; 65/27, 65/29.13, 29.19, 29.12, 134.6, 168

[56] References Cited

U.S. PATENT DOCUMENTS

| | | | |
|---|---|---|---|
| 4,631,080 | 12/1986 | Westra | 65/27 |
| 4,738,702 | 4/1988 | Yigdall | 65/134.6 |
| 4,944,785 | 7/1990 | Sorg | 65/134.6 |
| 5,123,936 | 6/1992 | Stone | 55/487 |
| 5,243,621 | 9/1993 | McNeill | 373/33 |
| 5,319,669 | 6/1994 | Cox | 65/134.6 |

*Primary Examiner*—John Hoffmann
*Attorney, Agent, or Firm*—Harold M. Dixon; William R. Moser; Paul A. Gottlieb

[57] ABSTRACT

Apparatus and method for melting glass in a glass melter in such a way as to reduce deposition of particulates in the off-gas duct. Deposit accumulation is reduced by achieving an off-gas velocity above approximately 15 meters/second and an off-gas temperature as close as possible to, but not higher than, the glass softening point. Because the deposits are largely water-soluble, those that do form on the interior surface of the duct can be readily removed by injecting water or steam directly into the off-gas duct from its entrance or exit.

15 Claims, 3 Drawing Sheets

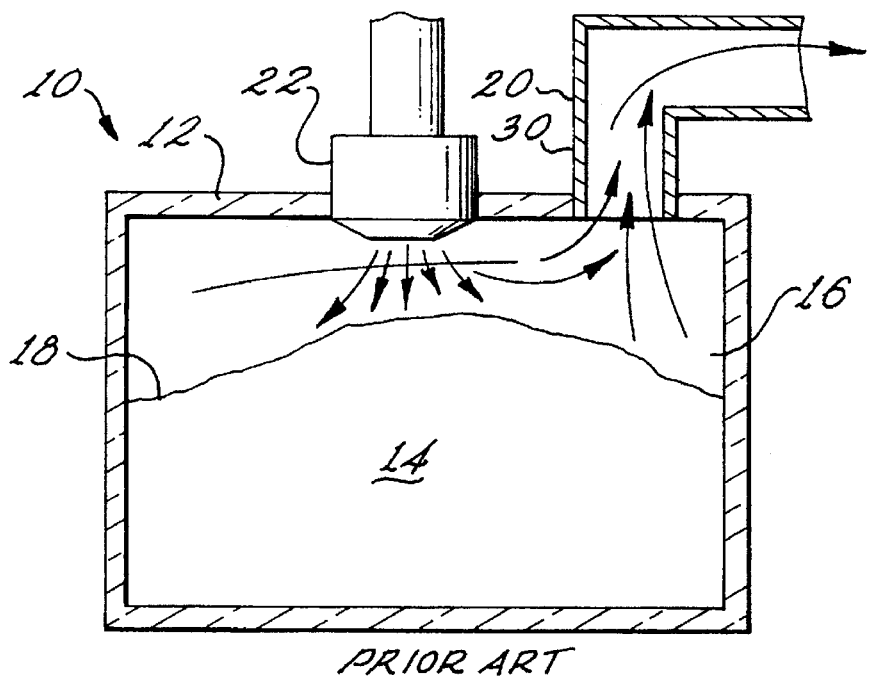
PRIOR ART
Fig. 1.
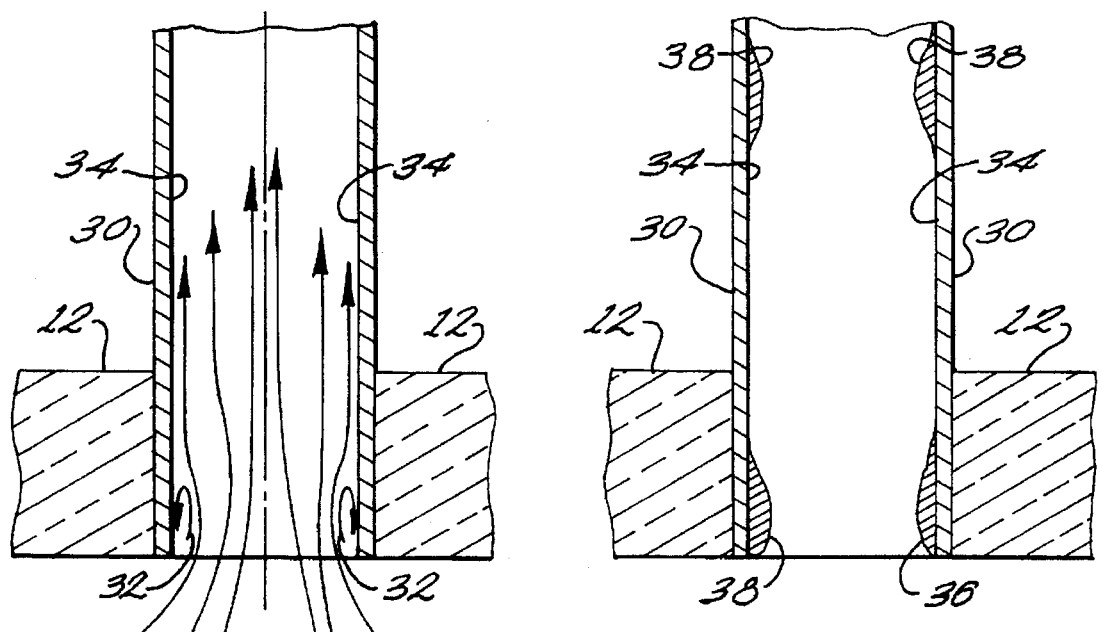
PRIOR ART
Fig. 2a.
PRIOR ART
Fig. 2b.

GLASS MELTER OFF-GAS SYSTEM

This application is a continuation of application Ser. No. 08/264,277, filed Jun. 23, 1994, abandoned which is a Division of application Ser. No. 07/841,170 filed Feb. 25, 1992, abandoned.

BACKGROUND OF THE INVENTION

1. Field of the Invention

The present invention relates generally to glass melters. In particular, the present invention relates to methods and apparatus for limiting the deposition of particulate materials in the off-gas duct of a glass melter. The United States Government has rights in this invention pursuant to Contract No. DE-AC09-89SR18035 between the U.S. Department of Energy and Westinghouse Savannah River Company.

2. Discussion of Background

A typical melter, furnace or reaction vessel generally includes a lower portion with electrodes for heating material, an upper portion or "plenum", a device for adding feed materials and an off-gas duct. Gases, vapors and heat generated during the process of heating the feed form a glass melt which exits the plenum through the off-gas duct. In many processes, small particles of feed materials and reaction products may also be swept up into the duct directly after being injected into the melter.

Referring now to FIG. 1, a typical melter is shown in cross section. Melter 10 has a wall 12 and may have external or internal heaters (not shown) for heating material 14 in the lower portion of melter 10. Upper portion or plenum 16, above material 14, contains gases and vapors generated during the process. These gases and vapors eventually find their way to an off-gas duct 20 where they are vented from plenum 16. During processes such as glass manufacturing the liquified material 14 or "melt" may be covered by a floating cap or crust 18. Liquified glass is extracted through a pour spout (not shown).

A feed injector nozzle 22 is located in the top of plenum 16 for injecting feed material into melter 10. If nozzle 22 injects feed in the form of a slurry, the liquid and other volatile components in the slurry are rapidly vaporized as they enter melter 10, causing entrainment of the feed particulates. Thus, some of the finer particulates and the carrying liquid of the slurry may find their way to duct 20 directly without reaching the balance of material 14 in the lower portion of melter 10.

Gases and steam form under rigid cold cap 18 during melting. When enough gas accumulates, the gas vents through cap 18 releasing a surge of gas and particulates that will exit through duct 20. Transport of particulates into duct 20 is also possible when melt components containing cesium and halides volatilize at the high temperatures of molten glass and later condense to form fine aerosols.

FIGS. 2a and 2b show a side cross-sectional view of duct 20. Duct 20 has a wall 30 attached to wall 12 of melter 10. As gas and vapors leave plenum 16 they go from an unconfined volume in plenum 16 to a relatively confined volume in duct 20, as suggested in FIG. 2a by flow lines. Near wall 30, however, recirculation zones 32 are created by the friction of the gas flowing near the interior surface 34 of duct 20. When air and gases flow from plenum 16 to the smaller volume of duct 20, recirculating currents are established near inside wall 34 near the entrance of duct 20. These particules adhere to wall 30, agglomerate and eventually plug duct 20. As shown in FIG. 2b, particulate deposits 36 form on surface 34 near recirculation zones 32.

Smaller particles and vapors proceed into duct 20, where some deposits 38 are deposited on wall 30 further downstream. The accumulations of deposits 36, 38 can increase to the extent that the flow of off-gas through duct 20 is restricted, eventually leading to a system shutdown. In addition, if deposits 36, 38 contain corrosive materials, their accumulation may contribute to the eventual degradation of wall 30.

Removal of deposits 36, 38 is necessary when total pluggage occurs to assure proper operation of melter 10 and requires the shutdown of melter operations and time for cooling. Sections of wall 30 may have to be inspected for corrosion and replaced or repaired. Cleaning is difficult and tedious. Manual cleaning may be feasible in some cases, however, robotic apparatus must be used where duct 20 is not readily accessible, or where deposits 36, 38 may include radioactive or other hazardous materials. In vitrification processes for immobilization of high-level radioactive waste, exposure of personnel and accumulations of radioactive materials in any part of the system must be minimized.

Deposition of particulates near the entrance to duct 20 can be minimized by use of the Cooler and Particulate Separator described in commonly assigned U.S. Pat. No. 5,156,659. This device consists of a sleeve through holes in which steam or air is injected to form a gas film on the inner surface of the off-gas duct. The film forms a boundary layer that cools the duct wall, as well as any particulates penetrating the boundary layer, thereby reducing the potential for deposits to form on the surface near the entrance to the duct. After leaving the duct, the off-gas is cooled to condense water vapor and volatile components, then it is filtered to remove contaminants before release to the atmosphere.

Deposition of particulates within an off-gas duct can also be reduced by using gas jets to direct the flow of off-gas away from the walls of the duct. The position of the air jet, air stream velocity, and flow rate may be adjusted to optimize the effectiveness of the air jet as the batch material or melting furnace firing rate changes (Tsai, U.S. Pat. No. 4,678,491). Deposits of some glassmaking materials can be mechanically removed from an off-gas duct by periodic blasts of air from a plurality of nozzles mounted in the duct (Schwenninger et al., U.S. Pat. No. 4,969,942). These methods, however, rely on a mechanical solution and do not address the nature of the deposits and the complexities of the processes involved in deposit formation.

In a typical vitrification process for radioactive waste, the major radioactive melt component that can vaporize, condense, and accumulate in the off-gas line is cesium. In such processes, it is highly desirable to avoid significant deposit buildup.

SUMMARY OF THE INVENTION

According to its major aspects and broadly stated, the present invention is an apparatus and method for melting glass in such a way that particulates and vapors exiting through the melter off-gas duct do not form deposits on the duct interior as easily and, to the extent that deposits do form, they can be easily removed. The apparatus comprises a containment, electrodes in the containment for heating the glass until it melts, an injector for injecting glass feed into the containment, and an off-gas duct for venting off-gas generated in the processes of feeding and melting the glass. The off-gas duct has an entrance in communication with the containment interior and an opposing exit and means for accelerating the off-gas above a minimum velocity through said off-gas duct, preferably above 15 meters per second. The off-gas can be accelerated by dimensioning the off-gas duct to produce an acceleration of the gas from the interior of the containment to the desired velocity at the entrance of the duct based on the temperature of the off-gas in the containment and the pressure of the gas at that temperature. Alternatively, the temperature of the off-gas can be raised to diminish condensation. However, the temperature of the off-gas at the entrance to the duct must not exceed the softening temperature of the glass. The apparatus further comprises, in a preferred embodiment, means for injecting steam into the containment in such a way that the steam exits the duct and dissolves deposits. The dissolved deposits are carried by the exiting off-gas. Still another part of the apparatus in a preferred embodiment is means for injecting water into the duct from the exit so that deposits can be dissolved from the other direction by the falling water.

The dimensioning of the off-gas duct to provide the requisite minimum off-gas velocity is an important feature of the present invention. If the velocity is at least 15 meters per second and the off-gas temperature is less than the softening temperature of the particular glass being processed, deposit of particulates on the duct interior surface is greatly reduced. This feature obviates the need for mechanical solutions to this problem and simplifies manufacturing of glass. Furthermore, the duct can be sized to produce the minimum off-gas velocity for a variety of different melters simply by knowing the temperature of the off-gas and volume of the containment.

Adjusting the temperature of the off-gas is another important feature of the present invention. The temperature of the off-gas at the entrance of the off-gas duct must be maintained as high as possible below the glass softening temperature (about 460° C.), preferably greater than about 325° C. to stop vapors from condensing. Above the softening temperature, particulates can stick more easily to the interior surface of the duct. Below that temperature, the particulates are more likely to be swept through the duct but vapors are more likely to condense.

Because deposits will inevitably form to some degree, two features in a preferred embodiment are important for removal of these deposits. An examination of the deposits, both loose and fixed, formed on the interior surface of an off-gas duct of a melter that was fed a borosilicate glass shows that the major species present in the downstream deposits are alkali-rich chlorides, sulfates, borates, and fluorides, with entrained $Fe_2O_3$, spinels ($NiFe_2O_4$), and glass frit particles. The major constituents are water-soluble. Moreover, the spatial distribution of deposit constituents indicates that formation is primarily by vapor phase transport and subsequent condensation. Deposition of the oxide components occurs by entrainment and cementation by the condensing species. This characteristic is used by two features of the present invention. One of these features is a means for injecting stem into the containment to create an off-gas surge to partially clear away the deposits. If particulates accumulate to too great an extent, the second feature, the injection of water from the exit of the duct toward the entrance will result in a greater mount of particulates being dissolved. A significant advantage of these features is that they extend the time until manual (or remote mechanical) cleaning and repair, thus minimizing down time and personnel exposure.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 illustrates in cross section a typical melter or furnace;

FIG. 2a shows a detail of the entrance to a prior art off-gas duct with the air flow lines indicated;

FIG. 2b shows the prior art off-gas duct of FIG. 2a with deposits of particulates on the interior surface;

DETAILED DESCRIPTION OF A PREFERRED EMBODIMENT

The chemical composition of the deposits that build up in the off-gas system of a glass melter and the mechanisms responsible for their formation were identified through an extensive study. The glass used was a black borosilicate glass feed. Samples of the deposits were taken from different locations in the off-gas ducts of several melters. The samples were analyzed and found to be mixtures of alkali-rich chlorides, sulfates, borates, and fluorides, with entrained $Fe_2O_3$, spinel, and glass frit particles. The spatial distributions of the deposits throughout the off-gas system indicate that the deposits form by vapor-phase transport and subsequent condensation. Condensation of the alkali-rich phases cements the particulates entrained in the gas, eventually causing pluggage of the off-gas line. As a result of the information gained through this analysis, it was realized, somewhat surprisingly, that deposit formation can be effectively controlled by maintaining the velocity of off-gas flow above about 15 meters/sec while simultaneously maintaining the off-gas temperature above approximately 325° C., preferably within the range 350° C.±25° C., but below the softening temperature of the glass (about 460° C.).

Figure 3:
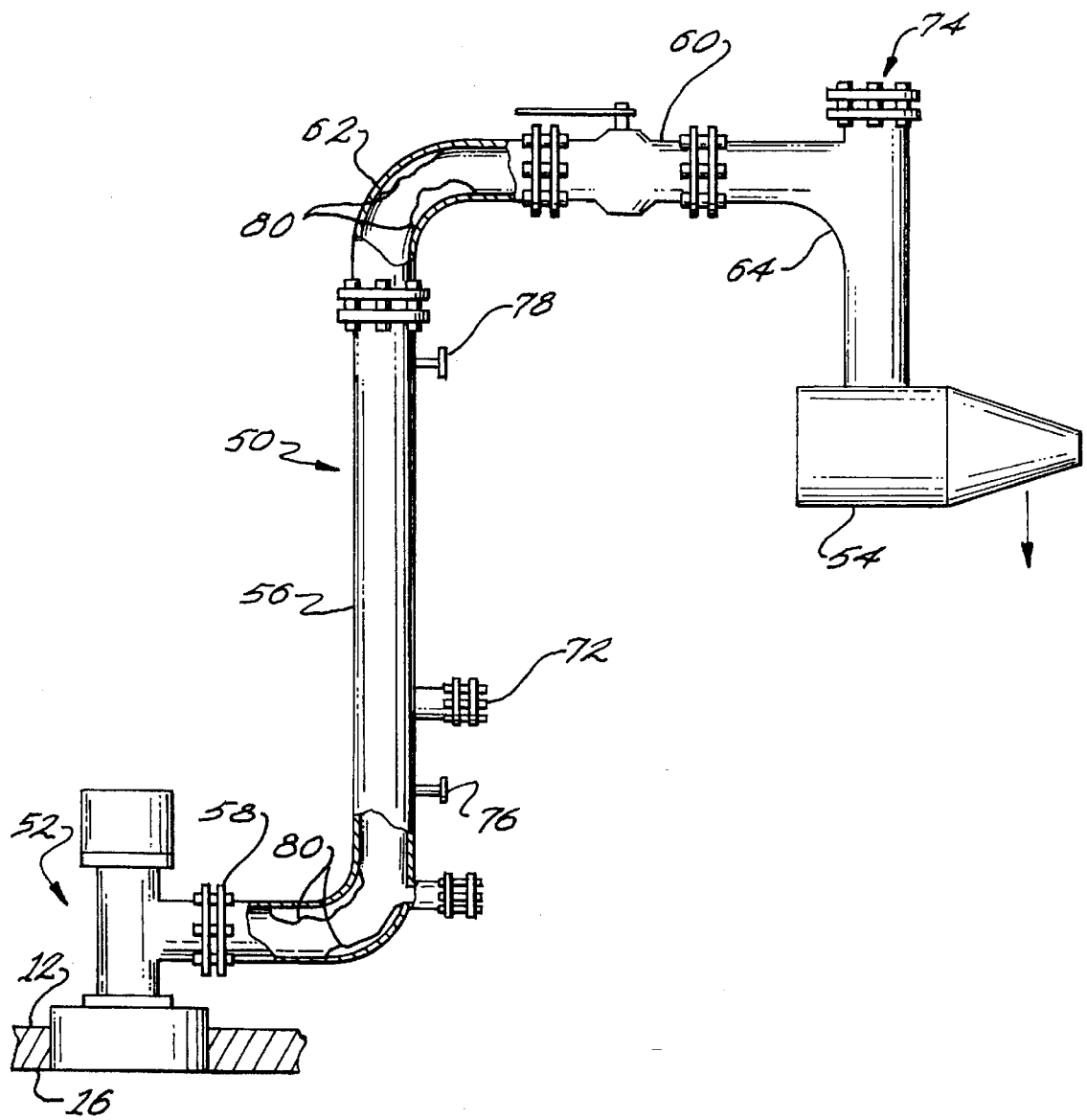
FIG. 3 shows in cross-section a typical off-gas duct.

A typical off-gas duct 50 is shown in cross-section in FIG. 3. Duct 50 connects a cooler and particulate separator 52 to a quencher 54. Particulate separator 52 is connected to a header 56 via a coupling 58. Located between header 56 and quencher 54 is an isolation valve 60, connected to header 56 and quencher 54 by couplings 62 and 64, respectively. Duct 50 may include an inspection port 70, an inspection sample line 72 for sampling the off-gas, an inspection flange 74, a thermocouple 76 for measuring the temperature within header 58, and a pressure tap 78. During operation, particulate deposits form at various locations within duct 50, as indicated in FIG. 3 by reference character 80.

Off-gas from plenum 16 enters particulate separator 52 and passes through duct 50 to quencher 54, where the off-gas is cooled to condense water vapor, semi-volatile species, and aromatic hydrocarbons. The gas is further cooled in a condenser (not shown) to remove water, then decontaminated and filtered prior to release to the atmosphere.

Samples were obtained from a number of locations within the off-gas ducts of several experimental melters. Loose deposits as well as deposits that had adhered to the interior surface of the ducts were collected and analyzed. The crystalline phase content of the samples was determined by X-ray diffraction (XRD). Since the waste glasses cannot be detected by XRD, X-ray fluorescence (XRF) was used to detect the heavier elemental components. The samples were further analyzed by scanning electron microscopy (SEM) coupled with energy dispersive analysis by X-ray (EDAX).

The weight % solids was determined by heating the samples in $Al_2O_3$ crucibles up to 900° C. for 21 hours. The techniques employed in the chemical analyses included dissolution by $Na_2O_2$ with HCl uptake, dissolution by HCl/HF bomb, and dissolution by $Na_2O_2$ with $H_2O$ uptake.

Solid samples were placed in deionized water in an ultrasonic bath at ambient temperature (about 20° C.) for about 5 minutes. The residue was analyzed for XRD phase identification. The water was decanted and analyzed to determine the composition of the soluble components of the samples.

Occurrence of deposits in relation to the operating parameters of the process and the design of the off-gas system was studied. The factors investigated included feed composition, occurrence of premeditated off-gas surges, off-gas velocity and temperature.

The following results were found. No weight loss was observed during heating in the open crucibles, indicating that the deposits were not composed of either the low vapor-pressure organics or hydrous crystalline phases.

The samples were found to be enriched in Na, K, and Cs compared to the borosilicate feed. Enrichment to a more limited extent in Cr, Fe, and B was observed. The samples were also enriched in anions, primarily $SO_4$ and Cl, with small amounts of F and minor quantities of the heavier glass constituents, such as Ti, Zr, and Sr.

The samples collected near the entrance to the off-gas duct contained more Fe and B than those collected further downstream, indicating that entrained glass and iron-rich spinels were present. Samples collected further downstream contained larger quantities of Cr, Cl, and $SO_4$. Both Na and F were distributed evenly in the deposits regardless of their locations.

The samples exhibited very complex crystalline phase compositions, with details depending on the composition of the melter feed. Several crystalline phases were found to exist in each sample, with some samples containing as many as 12 individual phases. The crystalline phases observed included (Na,K,Cs)Cl, as mixture salts such as $Na_{0.4}K_{0.6}Cl$ or $Na_{0.5}K_{0.5}B_4O_7$, $(Na,K,Cs)_2SO_4$, $NiFe_2O_4$ (spinel), $SiO_2$, $Na_2B_4O_7$, and $Fe_2O_3$, together with traces of $KBF_4$, $(Na,K)CrO_4$, $(Na,K)_2SO_4$, and S. The major constituent present in the "loose" deposits was entrained spinel, whereas the major constituents in the "adhered" deposit samples were NaCl and either $Na_2SO_4$ or $(Na,K,Cs)_2SO_4$. The furthest downstream samples were relatively enriched in $SO_4$.

Many of the samples contained stainless steel, probably due to removal of minute quantities of Inconel-690 when the samples were removed from the Inconel-690 off-gas duct (Inconel-690 has an X-ray spectrum similar to that of stainless steel).

The relative distributions of the major constituents found in the samples were also noted. The entrained glass and oxides (spinel, $Fe_2O_3$, $SiO_2$) form relatively uniformly along duct 50. The major salt deposits and the chromate phases are concentrated downstream of the entrance to duct 50. The borate, chloride and sulfate phases are concentrated near the entrance to duct 50.

These observations indicate that the deposits containing alkali halides and chromates are formed primarily by vapor phase transport and subsequent condensation. The borate phases have a higher vapor pressure than the chloride, fluoride, sulfate, and chromate phases. Thus, they condense more quickly, accumulating near the entrance to duct 50. The oxides are evenly distributed, suggesting that deposition occurs by entrainment and cementation by the condensing species.

Samples were heated from 250° C. to 800° C. in 50° C. intervals. Starting at 700° C., a liquid phase began to separate out from the remaining solid deposit, becoming completely liquified by 750° C. These low-melting-point compounds were determined to be $Na_2B_4O_7$ and $(Na,K)_2SO_4$—(Na,K)Cl.

The water that was decanted after dissolving the samples was found to be highly enriched in $SO_4$, Na, K, Cl, Cs, Li, Ca, B and Cr. Trace amounts of F (less than 0.01%) were also observed. The insoluble constituents were primarily spinels of the $NiFe_2O_4$ type, $SiO_2$, and $Fe_2O_3$, with residual amounts of NaCl and $Na_2SO_4$.

It was observed that partial or complete removal of deposits occurred during off-gas surges. This indicates that the deposits can be loosened and cleared away—or deposit formation reduced—by maintaining a sufficiently high off-gas velocity.

Deposit formation, off-gas velocity, and off-gas temperature were correlated for a number of different melters and it was found that formation of deposits is minimized when off-gas velocities are greater than about 15 m/sec, and off-gas temperatures are greater than about 300° C.

Analyses of the deposit samples indicate that deposits of the sodium borate phases accumulate near the entrance to off-gas duct 50, while the more volatile alkali sulfates, chlorides, and fluorides form deposits further downstream. Deposition by vapor phase transport indicates that B, $SO_4$, and Cl form $NaBO_2$, $KBO_2$, $CsBO_2$, and alkali salts. The alkali species, B, $SO_4$, and Cl form alkali metaborates and salts, all of which then condense and cement the entrained spinel and frit particles to the off-gas duct.

The combination of high off-gas velocity, together with high off-gas temperature, acts to minimize deposit formation. Off-gas velocity can be increased by maintaining the off-gas temperature as high as practicable, but below the glass softening point. Thus the desired temperature depends on the softening point of the feed material used in the process. Maintaining high off-gas temperatures also minimizes off-gas condensation. To minimize deposit formation within the off-gas line, the off-gas velocity should be greater than about 15 meters/sec. For alkali borosilicate feed, the temperature should be greater than about 325° C. The off-gas temperature can be maintained within the desired range by temperature-control means 138.

Figure 4:
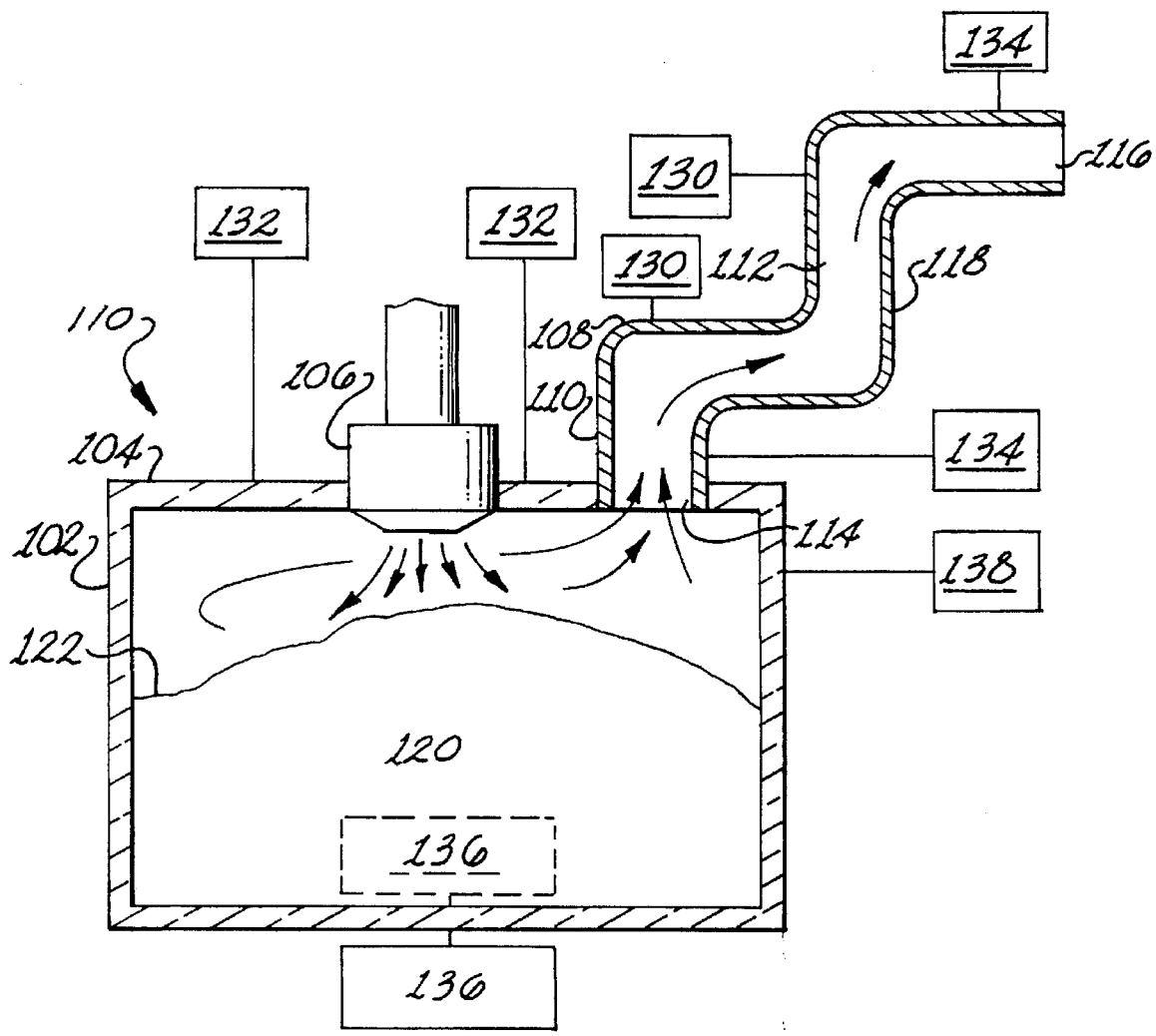
FIG. 4 illustrates in cross section a melter according to one embodiment of the present invention.

A melter according to one embodiment of the present invention is illustrated schematically in FIG. 4. Melter 100 has containment 102 with wall 104, feed injector nozzle 106 and off-gas duct 108. Duct 108 is similar to duct 56 of FIG. 3, with wall 110 attached to wall 104 of containment 102, interior 112, entrance 114, exit 116, and header 118. Internal or external heaters, represented schematically as heating means 136, are provided for heating glass batch material 120 in containment 102. Melt 120, in the lower portion of containment 102, has rigid cold cap 122. Liquefied glass is preferably extracted through a pour spout (not shown).

Simple design changes can lead to the desired range of off-gas velocities and temperatures. For example, the velocity can be achieved by reducing the diameter of off-gas header 118 as compared to the diameter of header 56. No other changes are required to ensure an off-gas velocity of at least 15 m/sec. However, adding fans along duct 108, indicated schematically by fans 130 in FIG. 4, would also increase off-gas velocity to the requisite minimum speed. It will be apparent that the optimum diameter of header 56 will vary depending on the particular system at hand.

Two safety criteria must be considered in the design of header 108. First, the diameter should be large enough to prevent over-pressurization of the melter under the surge conditions (several times the normal off-gas flow). Second, the melter operating conditions must be such that the off-gas exiting the melter is diluted adequately and the noncondensable off-gas remains below 60% of the Lower Explosive Limit (LEL).

As will be apparent, other changes in the design of a particular off-gas system may serve to provide the desired off-gas velocity. Depending on the details of the particular system, additional increases in the off-gas velocity might be achieved by revising the layout of the system, relocating various features such as pressure tap 78, sample line 72, and so forth. Furthermore, it is well known that accumulations of particulate material will form preferentially at any irregularities on the inside surface of a duct. Thus, the inside wall of off-gas duct 50 must be relatively smooth and free of protrusions or obstructions in the off-gas flow path.

When the deposits do form, steam can be injected directly into the melter from injection means 132, suitably located in the interior of melter 100 to create an off-gas surge which may partially clear away the deposits. The cementitious alkali borates, halides, and sulfates comprising the off-gas line deposits are water soluble. These deposits can, therefore, be dissolved by spraying water or steam directly into off-gas duct 108 by injection means 134.

It will be apparent to those skilled in the art that many changes and substitutions can be made to the preferred embodiment herein described without departing from the spirit and scope of the present invention as defined by the appended claims.

What is claimed is:

1. A method of operating a glass melter off-gas duct, a glass melter producing glass-containing particulate that enters said duct, said duct further having an exit, said glass melter melting glass having a softening temperature, said method comprising the steps of:

maintaining a flow of off-gas in said duct of at least approximately 15 meters per second; and simultaneously maintaining a temperature of the off-gas within said duct between approximately 300° C. and said softening temperature so that a temperature of said particulate in said duct is below said glass softening temperature.

2. The method as recited in claim 1, wherein said temperature-maintaining step further comprises maintaining the temperature of said off-gas between approximately 325° and approximately 375° C.

3. The method as recited in claim 1, further comprising the step of injecting steam into said off-gas duct to dissolve said glass containing particulates formed in said duct.

4. The method as recited in claim 1, further comprising the step of injecting water into said off-gas duct to dissolve said glass containing particulates formed in said duct.

5. The method as recited in claim 1, further comprising the step of injecting steam into said melter so that steam exits said off-gas duct, said steam dissolving said glass containing particulates formed in said duct.

6. The method as recited in claim 1, wherein the maintaining further comprises maintaining the temperature of said off-gas within the duct between approximately 325° and approximately 375° C., and wherein said method of operating a glass melter off-gas duct further comprises the step of injecting steam into said off-gas duct to dissolve said glass containing particulates formed in said duct.

7. The method as recited in claim 1, wherein the maintaining further comprises maintaining the temperature of said off-gas within the duct between approximately 325° and approximately 375° C., and wherein said method of operating a glass melter off-gas duct further comprises the step of injecting water into said exit of said off-gas duct to dissolve said glass containing particulates formed in said duct.

8. The method as recited in claim 1, wherein the maintaining further comprises maintaining the temperature of said off-gas within the duct between approximately 325° and approximately 375° C. and said method of operating a glass melter off-gas duct further comprises the steps of:

injecting steam into said off-gas duct to dissolve a first portion of said glass containing particulates formed in said duct; and injecting water into said exit of said off-gas duct to dissolve a second portion of said glass containing particulates formed in said duct.

9. A method of using a glass melter having a containment and an off-gas duct, a melter producing particulate which enters said duct, said duct further having an entrance and an exit, said entrance of said off-gas duct in communication with said containment, said glass melter melting glass having a softening temperature, said method comprising the steps of:

maintaining a flow of off-gas from said containment into said off-gas duct of at least approximately 15 meters per second; and simultaneously maintaining a temperature of said off-gas within said duct between approximately 300° C. and said softening temperature so that the temperature of said particulate in said duct is less than said softening temperature.

10. The method as recited in claim 9, wherein said temperature-maintaining step further comprises maintaining the temperature of said off-gas between approximately 325° and approximately 375° C.

11. The method as recited in claim 9, further comprising the step of injecting steam into said entrance of said off-gas duct to dissolve said glass containing particulates formed in said duct.

12. The method as recited in claim 9, further comprising the step of injecting water into said exit of said off-gas duct to dissolve said glass containing particulates formed in said duct.

13. The method as recited in claim 9 wherein the maintaining further comprises maintaining the temperature of said off-gas within the duct between approximately 325° and approximately 375° C., and wherein said method further comprises the step of injecting steam into said entrance of said off-gas duct to dissolve said glass containing particulates formed in said duct.

14. The method as recited in claim 9, wherein the maintaining further comprises maintaining the temperature of said off-gas within the duct between approximately 325° and approximately 375° C., and wherein said method further comprises the step of injecting water into said exit of said off-gas duct to dissolve said glass containing particulates formed in said duct.

15. The method as recited in claim 9, further comprising the step of injecting steam into said contaminant so that said steam exits said off-gas duct, said steam dissolving said glass containing particulates formed in said duct.

* * * * *